(12) United States Patent
Iliescu et al.

(10) Patent No.: US 9,643,715 B2
(45) Date of Patent: May 9, 2017

(54) FAILURE DETECTION MECHANISM FOR SELECTOR LEVER

(71) Applicant: BOMBARDIER INC., Dorval (CA)

(72) Inventors: Vlad Iliescu, Kirkland (CA); Menas Salib, Pierrefonds (CA)

(73) Assignee: BOMBARDIER INC., Dorval, Quebec (CA)

( * ) Notice: Subject to any disclaimer, the term of this patent is extended or adjusted under 35 U.S.C. 154(b) by 0 days.

(21) Appl. No.: 14/441,432

(22) PCT Filed: Nov. 27, 2012

(86) PCT No.: PCT/US2012/066620
§ 371 (c)(1),
(2) Date: May 7, 2015

(87) PCT Pub. No.: WO2014/084809
PCT Pub. Date: Jun. 5, 2014

(65) Prior Publication Data
US 2015/0266564 A1  Sep. 24, 2015

(51) Int. Cl.
*G05G 5/06* (2006.01)
*B64C 13/10* (2006.01)
(Continued)

(52) U.S. Cl.
CPC .............. *B64C 13/10* (2013.01); *B64D 31/04* (2013.01); *G05G 5/03* (2013.01); *Y10T 74/20612* (2015.01)

(58) Field of Classification Search
CPC ......... B64C 13/02; B64C 13/10; B64D 31/04; G05G 5/03
(Continued)

(56) References Cited

U.S. PATENT DOCUMENTS

| 1,987,066 A | 1/1935 | Kingston |
| 2,506,222 A | 5/1950 | Kesses |

(Continued)

FOREIGN PATENT DOCUMENTS

| CN | 101528539 A | 9/2009 |
| CN | 102092476 A | 6/2011 |

(Continued)

OTHER PUBLICATIONS

International Preliminary Report on Patentability dated Jun. 11, 2015, for International Patent Application No. PCT/US2012/066620.

(Continued)

*Primary Examiner* — Vicky Johnson
(74) *Attorney, Agent, or Firm* — Karceski IP Law, PLLC

(57) ABSTRACT

A selector lever includes a housing with front and rear ends and a lever with a shaft pivotally disposed on a cross-shaft. The shaft defines a shaft axis. The lever has a top that is disposed outside of the housing. A movable shaft moves substantially axially along the shaft axis. A pin, having first and second protrusions, is disposed adjacent to a bottom end of the movable shaft. A first detent plate is disposed on a first side of the movable shaft and includes at least a first slot that receives the first protrusion. A second detent plate is disposed on a second side of the moveable shaft and includes at least a second slot therein receiving the second protrusion. A first failure detection slot is associated with the first slot, permitting movement of the first protrusion therein in the absence of the second protrusion.

26 Claims, 10 Drawing Sheets

(51) Int. Cl.
*B64D 31/04* (2006.01)
*G05G 5/03* (2008.04)

(58) Field of Classification Search
USPC .......................................................... 74/527
See application file for complete search history.

(56) References Cited

U.S. PATENT DOCUMENTS

| | | | |
|---|---|---|---|
| 3,710,644 | A | 1/1973 | Downing et al. |
| 3,935,754 | A | 2/1976 | Comollo |
| 4,154,415 | A | 5/1979 | Harris et al. |
| 4,244,541 | A | 1/1981 | Dorn |
| 5,150,633 | A * | 9/1992 | Hillgartner ......... F16H 59/0204 74/473.18 |
| 6,125,714 | A * | 10/2000 | Woeste ............... F16H 59/0204 74/471 XY |
| 6,301,994 | B1 * | 10/2001 | Syamoto ................. F16H 59/10 74/473.3 |
| 2004/0128038 | A1 | 7/2004 | Richter et al. |

FOREIGN PATENT DOCUMENTS

| | | |
|---|---|---|
| EP | 1413515 A2 | 4/2004 |
| GB | 747507 | 4/1956 |

OTHER PUBLICATIONS

International Search Report and Written Opinion dated Jul. 13, 2013, for International Patent Application No. PCT/US2012/066620.
Chinese Office Action dated Jan. 25, 2016, for Chinese Patent Application No. 201280077278.8.
Chinese Office Action dated Sep. 13, 2016, for Chinese Patent Application No. 201280077278.8.

* cited by examiner

FAILURE DETECTION MECHANISM FOR SELECTOR LEVER

CROSS-REFERENCE TO RELATED APPLICATION(S)

This is a United States National Stage Patent Application of International Patent Application No. PCT/US2012/066620, filed Nov. 27, 2012, the entire contents of which are incorporated herein by reference.

FIELD OF THE INVENTION

The present invention concerns the construction and operation of a mechanism that permits detection of a failure of a selector lever, such as may be found in a cockpit of an aircraft. More specifically, the present invention concerns a mechanism that permits detection of a dormant failure of controller selector lever that may be employed to control high lift systems of an aircraft.

DESCRIPTION OF THE RELATED

As should be apparent to those skilled in the art, the design of aircraft and aircraft-related parts commonly includes redundant features.

In the design of a part or component with redundant features, typically there are primary and secondary elements. If the primary element fails, the secondary element is expected to maintain the functionality of the device by acting in the absence of the primary element. When neither element fails, both elements typically cooperate to assure functionality of the part.

For safety reasons, the concept of redundancy of design pervades most, if not all, of the critical components on every aircraft.

Not surprisingly, the design of controllers, for example, for the flaps on an aircraft incorporates redundant features and aspects.

As background to the present invention, reference is made to Great Britain Patent No. GB 747,507 (hereinafter "GB '507"), which describes improvements in control systems for actuating the control surfaces of an airplane. With reference to FIGS. 3 and 4 in GB '507, a side view of a pilot's landing flap control unit is provided. The flap control unit includes a handle or hand-lever 11, an outer drive lever 49, an inner drive lever 50, and a flap cable pulley 51, all of which are rotatably and independently mounted side by side on a mounting bolt 52. (GB '507 at page 3, lines 80-86.) The hand-lever 11 includes an outer end connected to the inner drive lever 50 via a torsion spring 54. (GB '507 at page 3, lines 86-90.) The hand lever 11 is actuated by the pilot to change the position of the lever.

While not associated with a hand lever for controlling the operation of the flaps on an aircraft, U.S. Pat. No. 3,935,754 (hereinafter "the '754 Patent") describes a failure detector and indicator for an aircraft flap actuation system. In particular, the '754 Patent describes a method and apparatus for detecting and indicating the failure of a primary drive train of a flap actuator system on an aircraft. (The '754 Patent at col. 1, lines 48-52.) The method described by the '754 Patent includes forming a free motion zone in the coupling system coupling the power supply to the secondary drive train. (The '754 Patent at col. 1, lines 52-55.) The method also includes sensing when the free motion zone is crossed, which condition occurs when the primary drive train fails. (The '754 Patent at col. 1, lines 55-57.)

U.S. Patent Application Publication No. 2004/0128038 (hereinafter "the '038 Application") describes an apparatus for generating control commands for actuating flaps and slats for an aircraft. In particular, the '038 Application describes, in connection with FIG. 5, a detent mechanism, which cooperates with the adjusting lever 3. (The '038 Application at paragraph [0026].) As illustrated and described, a detent catch member 33 engages a plurality of detents 31. (The '038 Application at paragraphs [0026]-[0027].)

U.S. Pat. No. 3,710,644 (hereinafter "the '644 Patent") also describes a control setting apparatus for the flaps and slats of an aircraft.

U.S. Pat. No. 4,244,541 (hereinafter "the '241 Patent") describes, in connection with FIG. 2A, a control device that includes a lug 41 that engages notches 38 along a curved member 32. (The '241 Patent at col. 5, lines 6-18.) The control device is used to adjust the position of the flaps on an aircraft.

While the prior art includes embodiments where a pin engages detents in a plate to control the position of the flaps on an aircraft, there remains an absence of any device that permits detection of the partial failure or near failure of the control lever or controller.

SUMMARY OF THE INVENTION

The present invention addresses one or more deficiencies associated with controllers adapted to control the position of flaps on an aircraft.

On embodiment of the present invention provides a selector lever that includes a housing defining a front end and a rear end. A lever includes a shaft pivotally disposed on a cross-shaft in the housing. The shaft defines a shaft axis and the lever has a top that is disposed outside of the housing. A movable shaft is associated with the lever. The movable shaft is movable substantially axially along the shaft axis. A pin is disposed adjacent to a bottom end of the movable shaft. The pin includes a first protrusion axially opposed to a second protrusion. A first detent plate is disposed on a first side of the movable shaft. The first detent plate includes at least a first slot that receives the first protrusion. A second detent plate is disposed on a second side of the moveable shaft, substantially parallel to the first detent plate. The second detent plate includes at least a second slot therein that receives the second protrusion. A first failure detection slot is associated with the first slot, permitting movement of the first protrusion therein in the absence of the second protrusion.

In a further contemplated embodiment of the present invention, the selector lever includes a biasing element operatively disposed between the shaft and the movable shaft to bias the movable shaft toward the cross-shaft.

In another embodiment, the selector lever includes a second failure detection detent associated with the second slot, permitting movement of the second protrusion therein in the absence of the first protrusion.

It is also contemplated that the selector lever may include a pin release mechanism connected to the movable shaft, permitting manipulation of the movable shaft so that the controller may be transitioned from a locked to an unlocked condition.

Where a pin release mechanism is contemplated to be included in the selector lever, the pin release mechanism includes a sleeve at least partially surrounding and connected to the movable shaft and a T-shaped top end.

It is contemplated that the biasing element will be a spring, such as a coil spring.

In addition, the first detent plate may include a plurality of slots. Similarly, the second detent plate may include a plurality of slots.

In one contemplated embodiment, the top of the lever is cooperative with the pin release mechanism by a hand compression.

In one embodiment, it is contemplated that the first failure detection slot is disposed adjacent to a trough of the first slot. Alternatively, the first failure detection slot may be disposed adjacent to a peak of the first slot. Still further, the first failure detection slot may be disposed between a trough and a peak of the first slot.

Similarly, it is contemplated that the second failure detection slot may be disposed adjacent to a trough of the second slot. Alternatively, the second failure detection slot may be disposed adjacent to a peak of the second slot. Finally, the second failure detection slot may be disposed between a trough and a peak of the second slot.

Still further, it is contemplated that the first slot may be disposed adjacent the rear end of the housing and that the second slot may be disposed adjacent to the front end of the housing. Alternatively, the first slot may be disposed adjacent to the front end of the housing and the second slot may be disposed adjacent to the rear end of the housing.

It is contemplated that the first detent plate and the second detent plate have an inverted symmetry with respect to one another.

In addition, the selector lever may provide control for at least one or flaps and slats on an aircraft.

The selector lever also may include a sensor to detect a position of the lever that deviates from a predetermined position. The sensor may be associated with the cross-shaft to detect an angular position of the lever.

Still further features of the present invention should be appreciated from the drawings appended hereto and from the discussion herein.

BRIEF DESCRIPTION OF THE DRAWINGS

The present invention will now be described in connection with the drawings appended hereto, in which.

DETAILED DESCRIPTION(S) OF THE INVENTION

The present invention will now be described in connection with one or more embodiments. Discussion of any one particular embodiment is intended to be illustrative of the breadth and scope of the invention. In other words, while attention is focused on specific embodiments, those embodiments are not intended to be limiting of the scope of the present invention. To the contrary, after appreciating the discussion and drawings presented herein, those skilled in the art will readily appreciate one or more variations and equivalents of the embodiments described and illustrated. Those variations and equivalents are intended to be encompassed by the present invention as though they were described herein.

Throughout the discussion that follows, the present invention will be discussed in connection with an aircraft. While the discussion of the present invention focuses on an aircraft, the present invention should not be considered as being limited to an aircraft. To the contrary, the present invention may be applied to any other mode of transportation, including railway locomotives, where a controller like the selector lever of the present invention might be employed to control one or more aspects of that mode of transportation. In addition, the present invention may be applied to control any device, vehicle or system (such as a power plant) incorporating a control lever.

Figure 1:
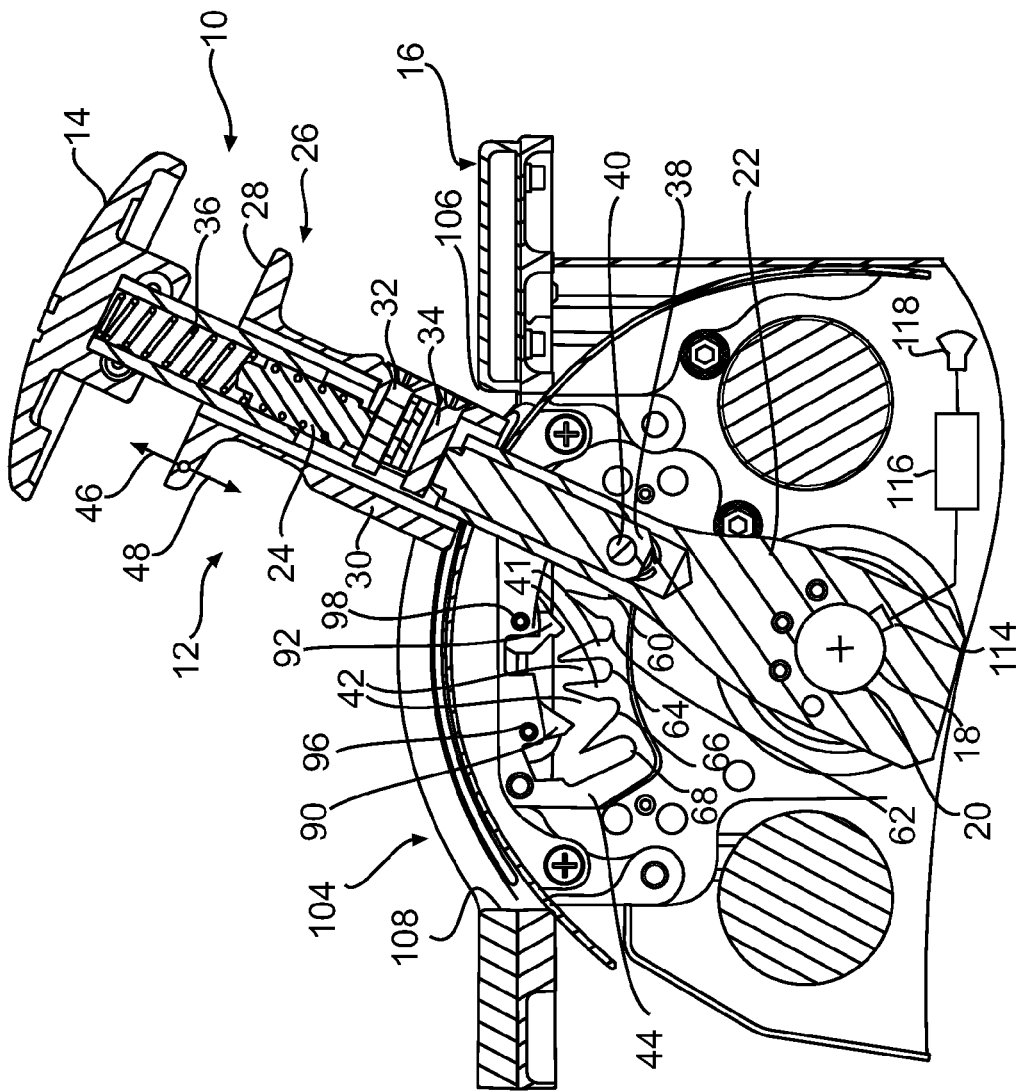
FIG. 1 is a cross-sectional side view of a first embodiment of a selector lever including the failure detection feature of the present invention (which feature is obscured by the lever in this view)

FIG. 1 is a cross-sectional side view of a hand-operated selector lever 10 according to a first embodiment of the present invention. As noted above, the selector lever 10 is contemplated to control the position of various control surfaces (not shown), such as the flaps and/or slats, on an aircraft. Specifically, the selector lever of the present invention is contemplated to be employed in connection with one or more of the high lift surfaces associated with an aircraft. It is noted, however, that the present invention is not intended to be limited to use as a controller for the high lift surfaces for an aircraft. The selector lever 10 may find other uses, in differing environments, without departing from the scope of the present invention.

The selector lever 10 includes a lever 12 with a flared top 14. The lever 12 is rotatably disposed within a housing 16 such that the lever rotates about a pivot point 18. The pivot point is defined by a cross-shaft 20 that secures the lever 12 within the housing 16.

The lever 12 is defined by a shaft 22 that is rotatably secured to the cross-shaft 20. At the top end of the shaft 22, the lever 12 includes a movable shaft 24, which slides within the shaft 22. As should be apparent, the moveable shaft 24 may be exterior to (or surround) the shaft 22 without departing from the scope of the present invention.

As illustrated in FIG. 1, the lever 12 includes a finger-actuated, pin release 26. The pin release 26 is a T-shaped structure in cross-section. The pin release 26 surrounds both the movable shaft 24 and the top part of the shaft 22. The pin release 26 includes a flared top end 28 and a cylindrical lower end 30. The flared top end 28 is disposed adjacent to the flared top 14 of the lever 12. The flared top end 28 and the flared top 14 coordinate with one another so that a pilot (or copilot) may operate the locking mechanism associated with the lever 12, as discussed in greater detail below.

As is apparent from FIG. 1, the pin release 26 is connected to the movable shaft 24 via two fasteners 32, 34. In the illustrated embodiment, the pin release 26 is biased in a direction toward the cross-shaft 20 by a spring 36 that is disposed between the flared top 14 and the movable shaft 24.

The bottom end 38 of the movable shaft 24 includes a pin 40 that engages with one from a plurality of detents 42 in a pair of detent plates 44 disposed within the housing 16. To disengage the pin 40 from the detent plate 44, the pilot pulls upwardly on the pin release 26 in the direction of arrow 46. The pilot does this by squeezing the pin release 26 with his or her fingers toward the flared top 14, thereby compressing the spring 36. When the pilot releases the pin release 26, the spring 36 applies a spring force in the direction of the arrow 48 to push the movable shaft 24 downwardly, thereby inserting the pin 40 into one of the slots 42 between two adjacent detents 41.

As should be apparent from FIG. 1 and the discussion above, when the pilot exerts a force on the pin release 26, the pin 40 disengages from a slot 42. As such, the arrow 46 indicates an unlocked direction of the pin release 26 and the unlocked condition of the selector lever 10. When the pilot releases the pin release 26, the spring 36 pushes the pin 40 into one of the slots 42 between two adjacent detents 41. As such, the arrow 48 indicates a locked direction of the pin release 26 and an unlocked condition of the selector lever 10.

Figure 2:
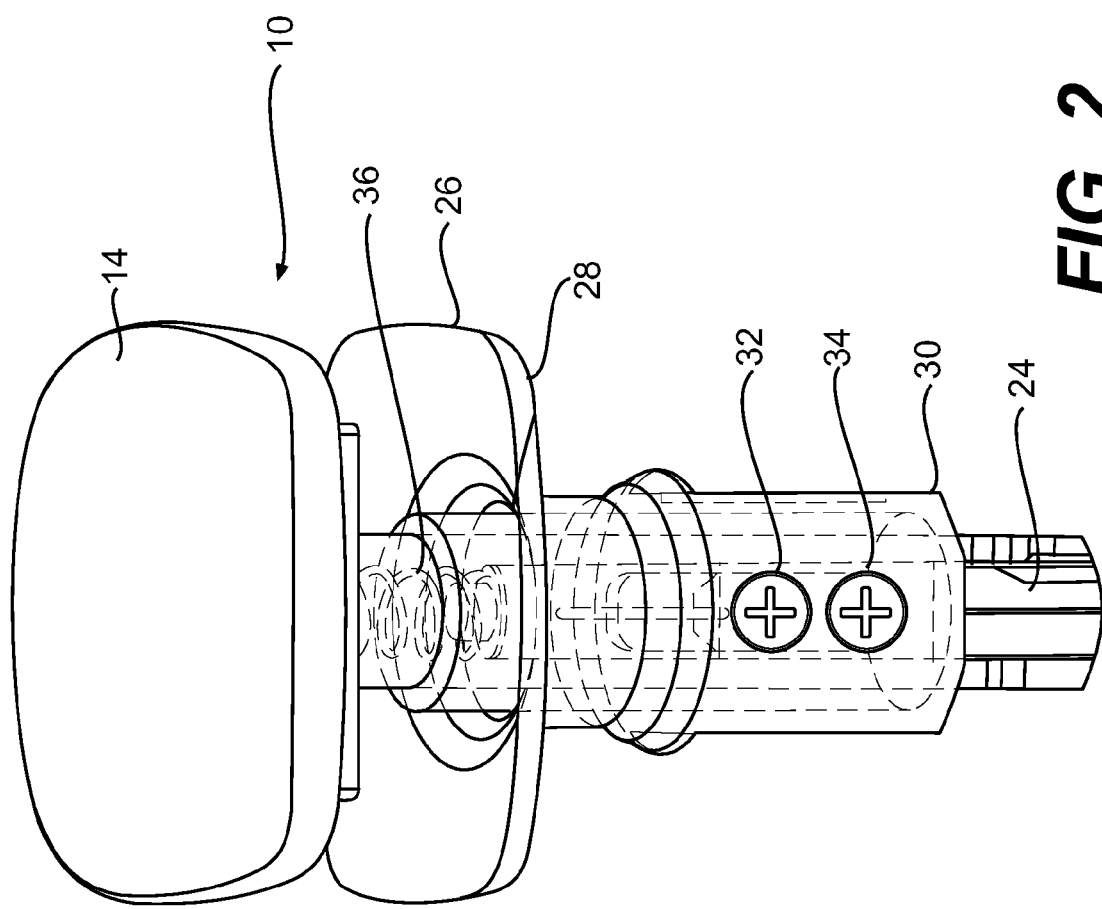
FIG. 2 is a perspective illustration of the top end of the selector lever illustrated in FIG. 1.

FIG. 2 is a perspective illustration of the top end of the selector lever 10. As shown, the flared top 14 is disposed a distance from the pin release 26. In this orientation, the selector lever 10 is in a locked condition. The spring 36 is visible in this partially-skeletonized depiction of the top end of the selector lever 10. The fasteners 32, 34 also are visible in this view.

Figure 3:
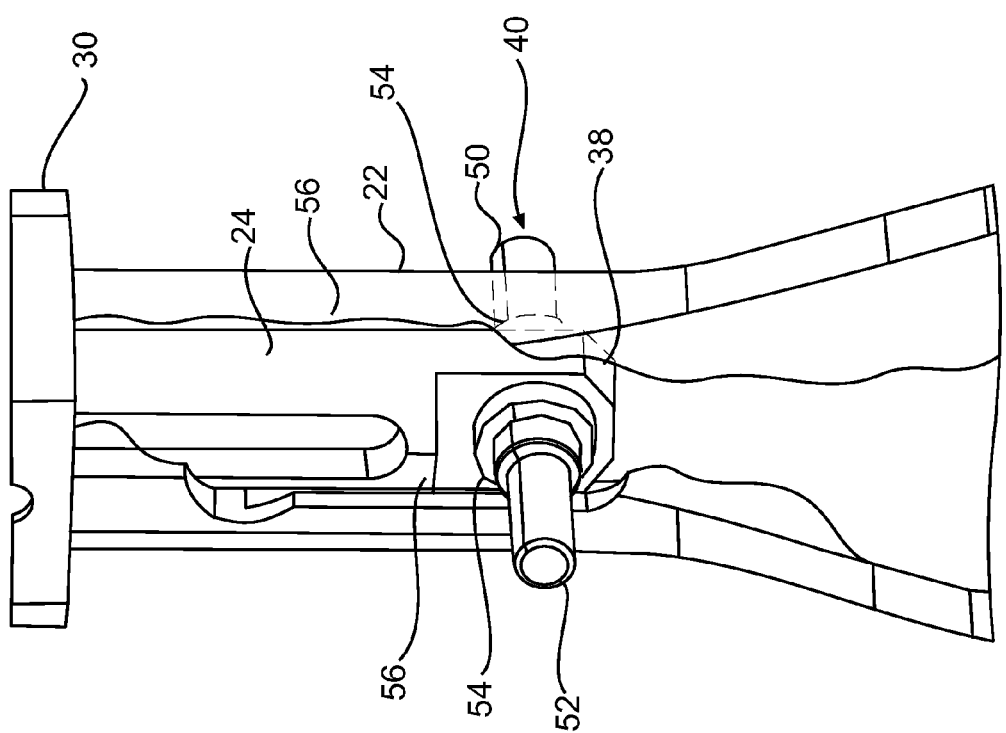
FIG. 3 is an enlarged, perspective illustration of the lower end of the selector lever illustrated in FIG. 1.

FIG. 3 is a perspective illustration of a portion of the shaft 22 including the bottom end 38 of the movable shaft 24. The location of the pin 40 also is provided in this view.

In the illustrated embodiment, the pin 40 includes two projections 50, 52, which extend from either side of the shaft 22. The pin 40 also includes a flanged portion 54 on the side of the pin including the projection 52. The flange 54 helps to maintain the pin 40 in an appropriate position within the movable shaft 24. To accommodate the projections 50, 52, the shaft 22 includes two slots 56 on either side thereof. The projections 50, 52 extend outwardly from the movable shaft 24 through the slots 56.

As noted above, the design of aircraft parts relies frequently on the concept of redundancy. This concept is evident in the design of the pin 40 with its two projections 50, 52. With this in mind, the primary projection 50 cooperates with the secondary projection 52 to provide redundancy for the operation of the selector lever 10 within the housing 16. As will be made more apparent in the discussion that follows, if one of the projections 50, 52 were to break off of the movable shaft 24 or become damaged, the remaining projection would provide the locking function needed for operation of the selector lever 10.

Figure 4:
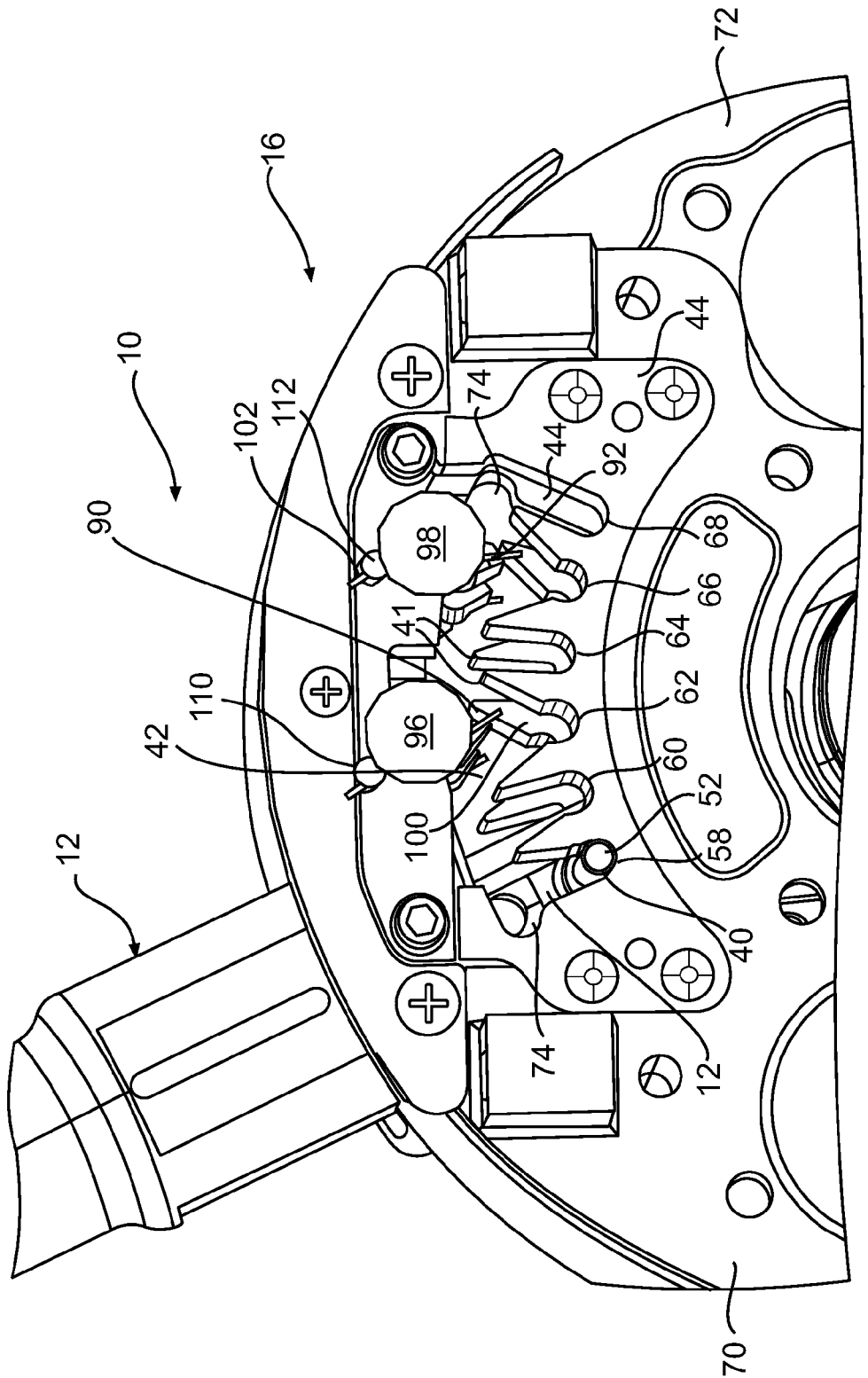
FIG. 4 is a perspective illustration of the selector lever illustrated in FIG. 1, from a different point of view, showing the two detent plates between which the bottom end of the selector lever travels.

FIG. 4 is a perspective illustration of a portion of the selector lever 10, showing a first embodiment of the detent plate 44 that forms a part of the present invention. The pin 40 and part of the movable shaft 24 are visible in this illustration. As is apparent, the selector lever 10 is in the locked condition, because the pin 40 engages one of the slots 42 in the detent plate 44. Also shown in this view is a second, redundant detent plate 44, which is disposed on the opposite side of the housing 16, parallel (or at least substantially parallel) to the first detent plate 44.

In keeping with the idea of redundancy, the housing 16 incorporates two detent plates 44, which are identical to one another. One projection 50 engages with one of the detent plates 44 while the other projection 52 engages the other detent plate 44.

As discussed above, the detent plates 44 incorporate several detents 41, which define different positions for the flaps on the aircraft. In the illustrated embodiment, each detent plate 44 includes six slots 42, which are labeled 58, 60, 62, 64, 66, 68. Each of the slots 42 are provided with a different identifying reference to facilitate the discussion that follows.

It is noted that the number and shape of the slots 58, 60, 62, 64, 66, 68 may be varied without departing from the scope of the present invention. In other words, a larger or a fewer number may be provided, depending upon the operational characteristics of the aircraft in which the selector lever 10 is installed.

The housing 16 depicted in FIG. 4 is shown with a rear end 70 to the left and a front end 72 to the right. The definitions of "rear" and "front" are provided merely for reference and have no relationship to the longitudinal directions associated with the aircraft.

The housing 16 is designed to have in inverted symmetry around a plane bisecting the housing 16 and extending parallel to the travel direction of the selector lever 10. The inverted symmetry will be described in greater detail below.

With continued reference to FIG. 4, the slot 58 is closest to the rear end 70 of the housing 16. The slot 68 is closest to the front end 72 of the housing 16. Each of the slots 58, 60, 62, 64, 66, 68 has a slightly different shape depending upon its location within the detent plate 44. As noted above, the shape of the slots 58, 60, 62, 64, 66, 68 need not be the same as those depicted to practice the present invention.

Focus is now directed to the slot 58, which includes at least one feature underlying the failure mechanism of the present invention. The slot 58 includes a failure detection slot 74 near to an upper end thereof. The failure detection slot 74 is positioned so that the operator of the selector lever 10 may determine tactilely if one of the protrusions 50, 52 has broken off of the pin 40. In other words, the failure detection slot 74 is provided specifically to permit the operator, such as the pilot or co-pilot, to assess if there has been a dormant (i.e., partial) failure of the pin 40. Alternatively, as discussed in greater detail below, the failure detection may be performed automatically via a sensor that responds to an abnormal position of the selector lever 10.

The failure detection slot 74 is intended to cooperate with the motion of the lever 12 when the lever 12 is at the position adjacent to the rear end 70 or adjacent to the front end 72 of the housing 16. Only one of the slots, specifically slot 58, incorporates the failure slot detent 74 therein. Because the housing has an inverted symmetry, the slot 58 on the right side of the housing 16 is adjacent to the rear end 70 of the housing 16 and the slot 58 on the left side of the housing 16 is adjacent to the front end 72 of the housing 16. In other words, the failure detection slot 74 is not at the same location on both sides of the housing 16.

The inverted symmetry of the housing 16 is intentionally provided for the selector lever 10. The reason for this is simple. With an inverted symmetry, it is possible to determine if there is a failure of the pin 40 on either side of the lever 12. In other words, with an inverted symmetry, the pilot or co-pilot can determine that one of the protrusions 50, 52 is missing or damaged. This permits the replacement of the pin 40 before there is a total failure of the pin 40, which may result in inadvertent deployment (or retraction) of the flaps and/or slats on the aircraft, unexpectedly affecting aircraft operation and performance.

Operation of the failure detection slot 74 will now be described in connection with the embodiment illustrated in FIG. 4.

If both of the protrusions 50, 52 are present on the pin 40 so that the pin 40 is operating as designed, the protrusions 50, 52 will engage the sides of the detents 41 and provide a "solid" feel to the engagement. In other words, when both protrusions 50, 52 are present and operating properly, the pilot will experience a solid engagement of the lever 12 at any of the positions for the slots 42 along the arc of the lever 12.

In the embodiment illustrated in FIG. 4, when the lever 12 is in the rearmost position adjacent to the rear end 70 of the housing 16, when the pilot lifts up the pin release 26 and moves the pin 40 into the upper position, the protrusion 52 will be at the same level as the failure detection slot 74. If the protrusion 50 (on the opposite side of the lever 12) is missing, the lever 12 will be able to move forwardly and rearwardly within the failure detection slot 74. In other words, the absence of the protrusion 50 will permit the protrusion 52 to move within the failure detection slot 74. If the lever 12 moves when in this configuration, the protrusion 50 has become damaged or has failed, suggesting that the pin 40 should be replaced.

As should be apparent from the foregoing, if the lever 12 deviates from its normal positioning as a result of the protrusion engaging the failure detection slot 74, the pilot may appreciate that the lever 12 is in an abnormal position. As a result, the pilot may be able to assess of the protrusion 50 has become damaged or has failed. Alternatively, as discussed in greater detail below, a sensor may be connected to the lever 12 (or an associated structure) to measure if the lever 12 is in an abnormal position. If the sensor determines that the lever 12 is in an abnormal position, the sensor may provide a signal that triggers an alarm signaling that the protrusion 50 has become damaged or has failed.

To test the viability of the protrusion 52, the lever 12 must be moved to the forwardmost position adjacent to the front end 72 of the housing 16. Here, the slot 68 does not include a failure detection slot 74. However, the slot 58 on the other side of the housing 16 includes the failure detection slot 74, as illustrated. Accordingly, when the lever 12 is in the forwardmost position and the pin release 26 is actuated so that the lever 12 is in an unlocked condition, if the protrusion 52 is missing, the protrusion 50 will bottom inside of the failure detection slot 74. If the protrusion 52 is missing or damaged, the protrusion 50 will be able to move within the failure detection slot 74. If the lever 12 departs from a normal position (i.e., advances past its normal position) when in the forwardmost location within the housing 16, the pilot is able to determine that the protrusion 52 is either damaged or missing and, therefore, that the pin 40 should be replaced. Again, one or more sensors may be employed to assist with this determination.

In connection with FIG. 4, it is noted that, if the protrusion 52 is missing from the pin 40 and the lever 12 advances past its normal position, the lever 12 may impact against the housing 16. Specifically, the housing 16 includes a cutout 104 with a rearward edge 106 and a forward edge 108. If the protrusion 52 is missing from the pin 40, the protrusion 50 will bottom inside of the failure detection slot 74, permitting the lever 12 to strike the rearward edge 106 of the cutout 104. As should be apparent, if the protrusion 50 is missing, the lever 12 may strike the forward edge 108 of the cutout 104 in the housing 16.

Figure 5:
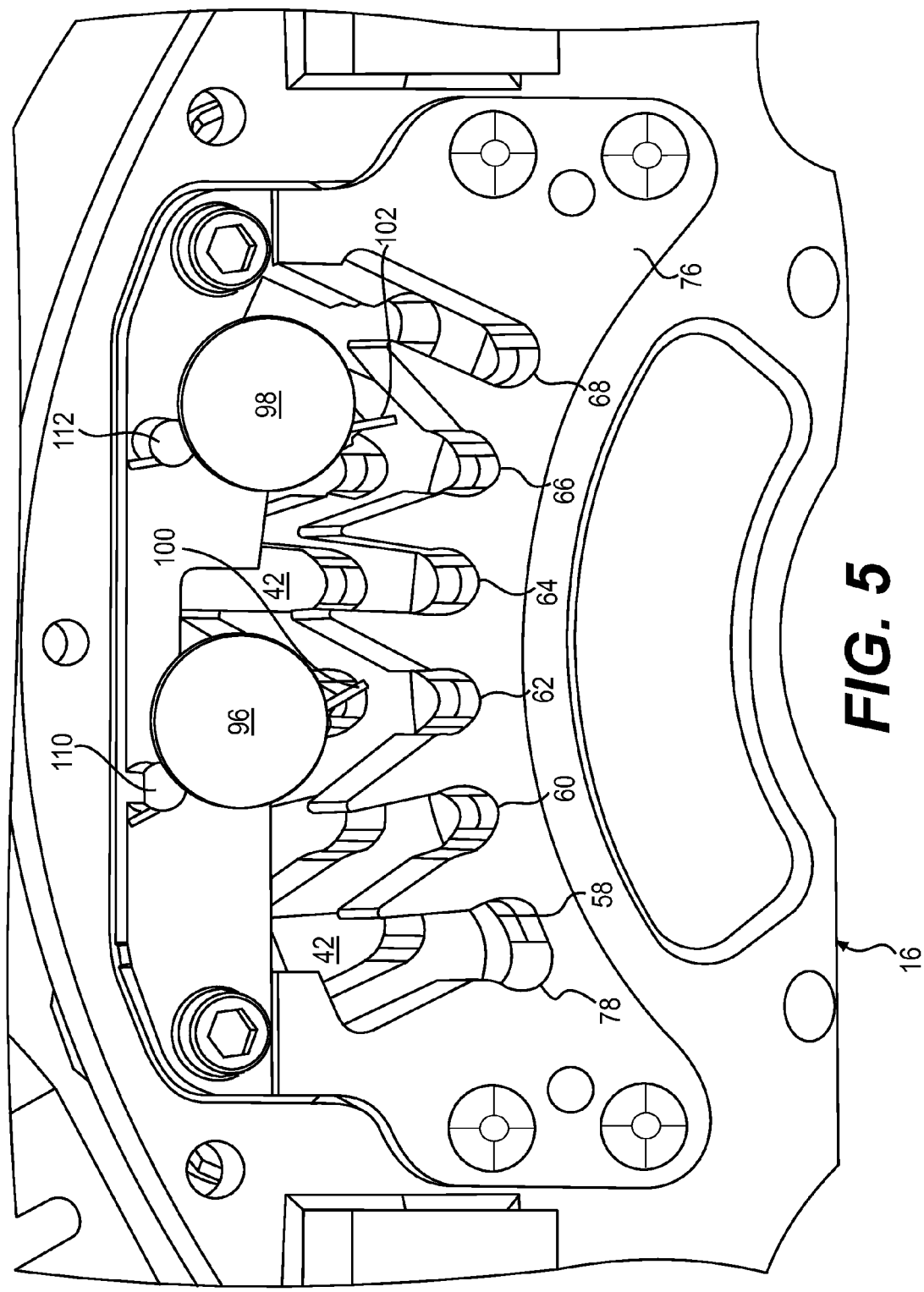
FIG. 5 is an enlarged, perspective view of a second embodiment of the detent plates for the selector lever of the present invention.

FIG. 5 illustrates a second embodiment of the selector lever 10 of the present invention. In this embodiment, the housing 16 includes a detent plate 76. Here, the failure detection slot 78 is provided at the bottom portion (or trough) of the slot 58 instead of at the top end (or peak) of the slot 58. The failure detection slot 78 operates in the same manner as the slot 74 discussed above in connection with the embodiment illustrated in FIGS. 1-4. With respect to this embodiment, however, testing of the pin 40 occurs when the pin release 26 is in the locked position rather than in the unlocked position. As before, if either of the protrusions 50, 52 should be missing, the lever 12 may strike either edge 106, 108 of the cutout 104 in the top of the housing 16.

Figure 6:
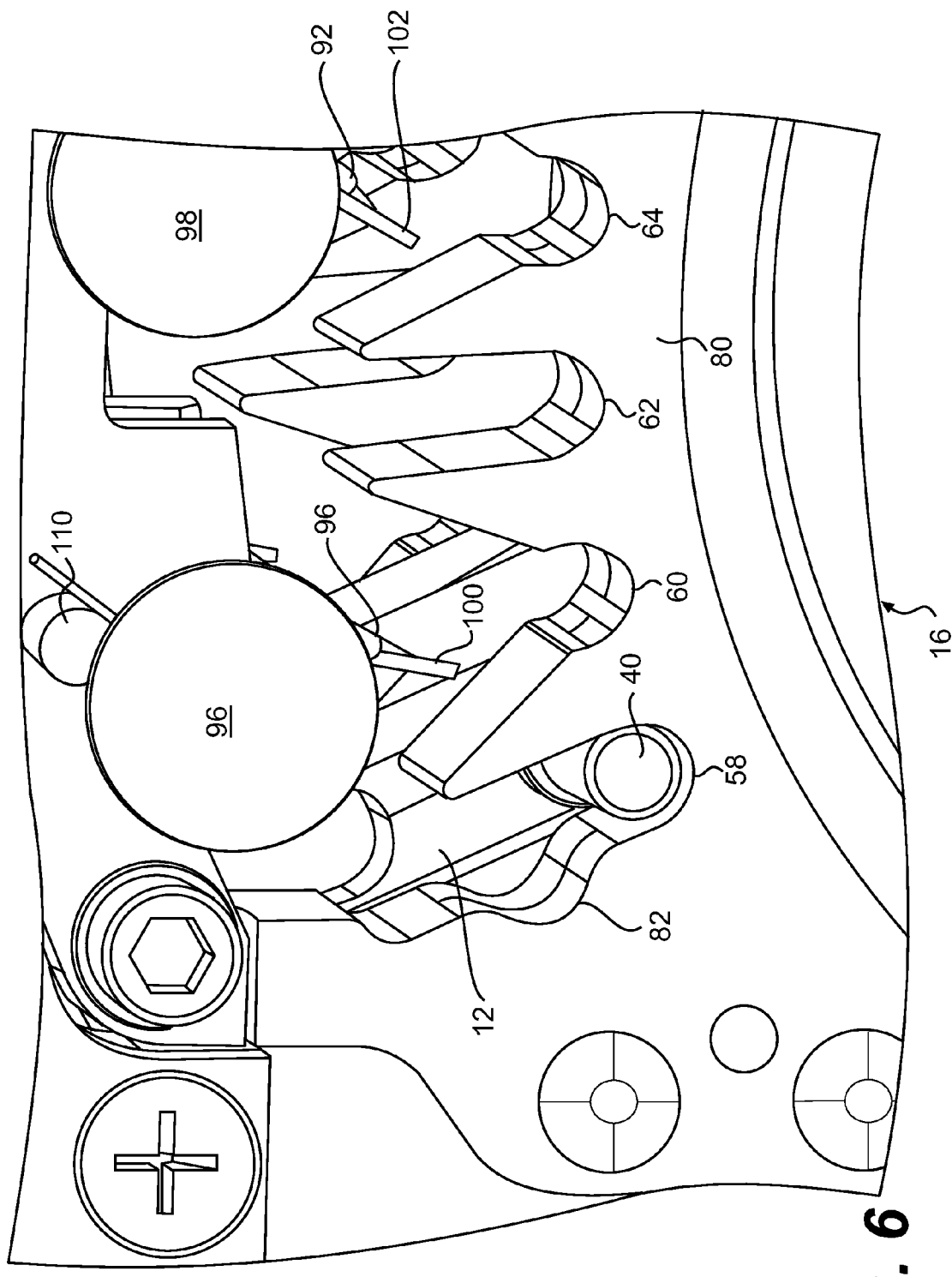
FIG. 6 is another enlarged, perspective view of a portion of a third embodiment of one of the detent plates forming a part of the selector lever of the present invention.

FIG. 6 illustrates a partial view of a third embodiment of the detent plate 80 according to the present invention. In this third embodiment, the failure detection slot 82 is positioned at a midway point between the trough and the top of the slot 58. This embodiment recognizes that any position intermediate to the top and bottom of the slot 58 may be utilized for failure detection. Testing of the pin 40 occurs while the pin release 26 is in an intermediate position between the trough and the peak of the slot 58. A departure of the lever 12 from its normal position while the pin 40 is in transition between the top and bottom ends of the slot 58 would be indicative of a latent failure of the pin 40. In addition, it is noted that the failure detection slot 84 may be located at any point between the trough and peak of the slot 58 without departing from the scope of the present invention.

Figure 7:
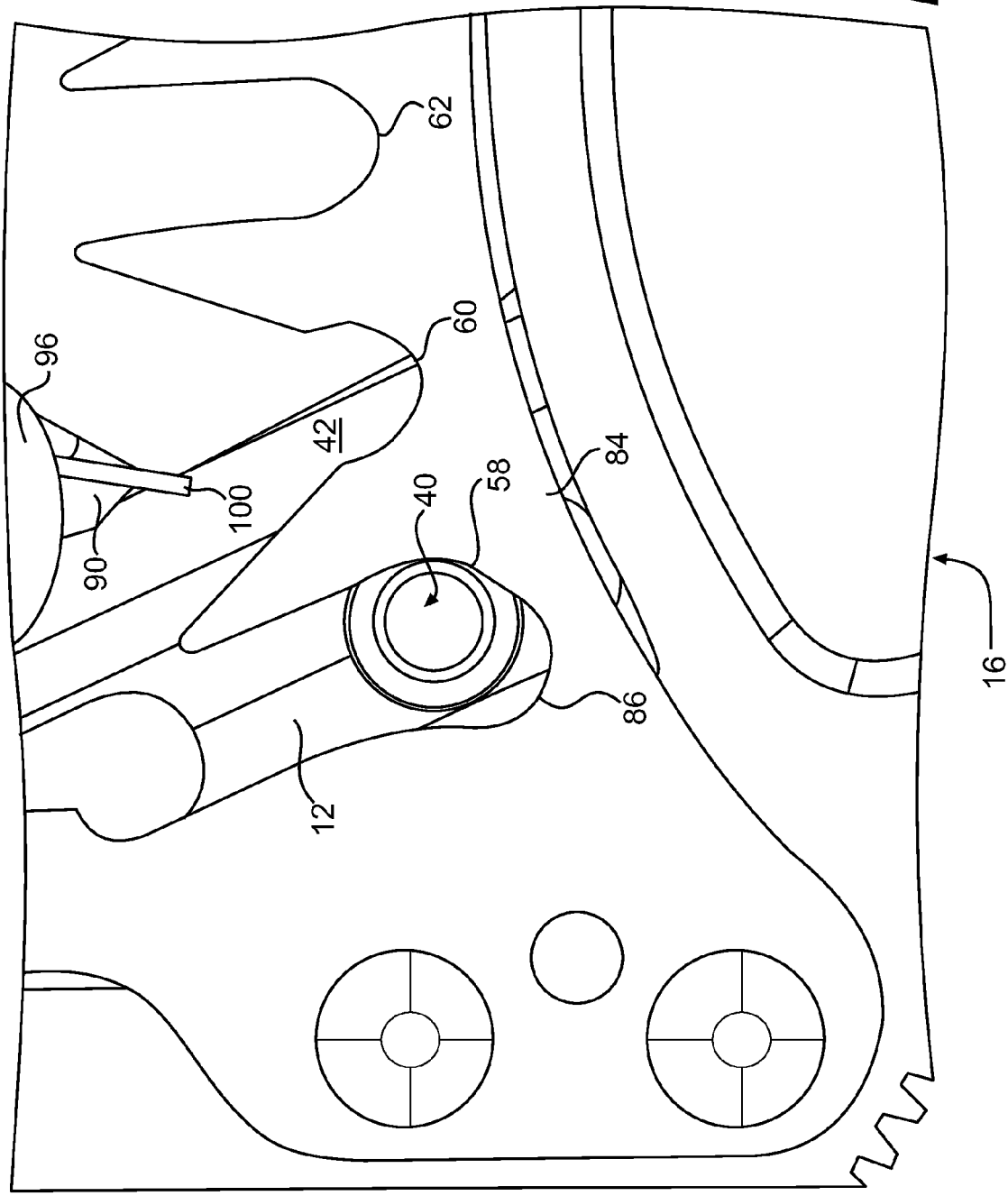
FIG. 7 is an enlarged, side view of a fourth embodiment of one of the detent plates forming a part of the selector lever of the present invention.

FIG. 7 is a partial view of a fourth embodiment of the detent plate 84 according to the present invention. In this fourth embodiment, the failure detection slot 86 is angled downwardly and rearward from the trough of the slot 58. In other words, the failure detection slot 86 has a configuration that differs from the configuration of the failure detection slot 74 illustrated in FIG. 5. This embodiment also illustrates that the failure detection slot 86 need not follow a path that is parallel to the arched motion of the pin 40 when the lever 12 is moved between its rearwardmost position and its forwardmost position. In other words, the shape of the failure detection slot 86 may depart from the embodiments provided herein without departing from the scope of the present invention.

In the embodiment illustrated in FIG. 7, the protrusion 52 is in a position where the protrusion 52 would be located if the protrusion 50 is not damaged or missing. If the protrusion 50 were damaged or missing, the protrusion 52 would move to the lowest position of the failure detection slot 86. Accordingly, the lever 12 would automatically travel to a non-standard position when the lever 12 is in the forwardmost or rearwardmost positions. This change in the position of the lever 12 would, therefore, indicate a partial failure of the pin 40, because the position of the lever 12 would differ from a normal positioning of the lever 12.

Figure 8:
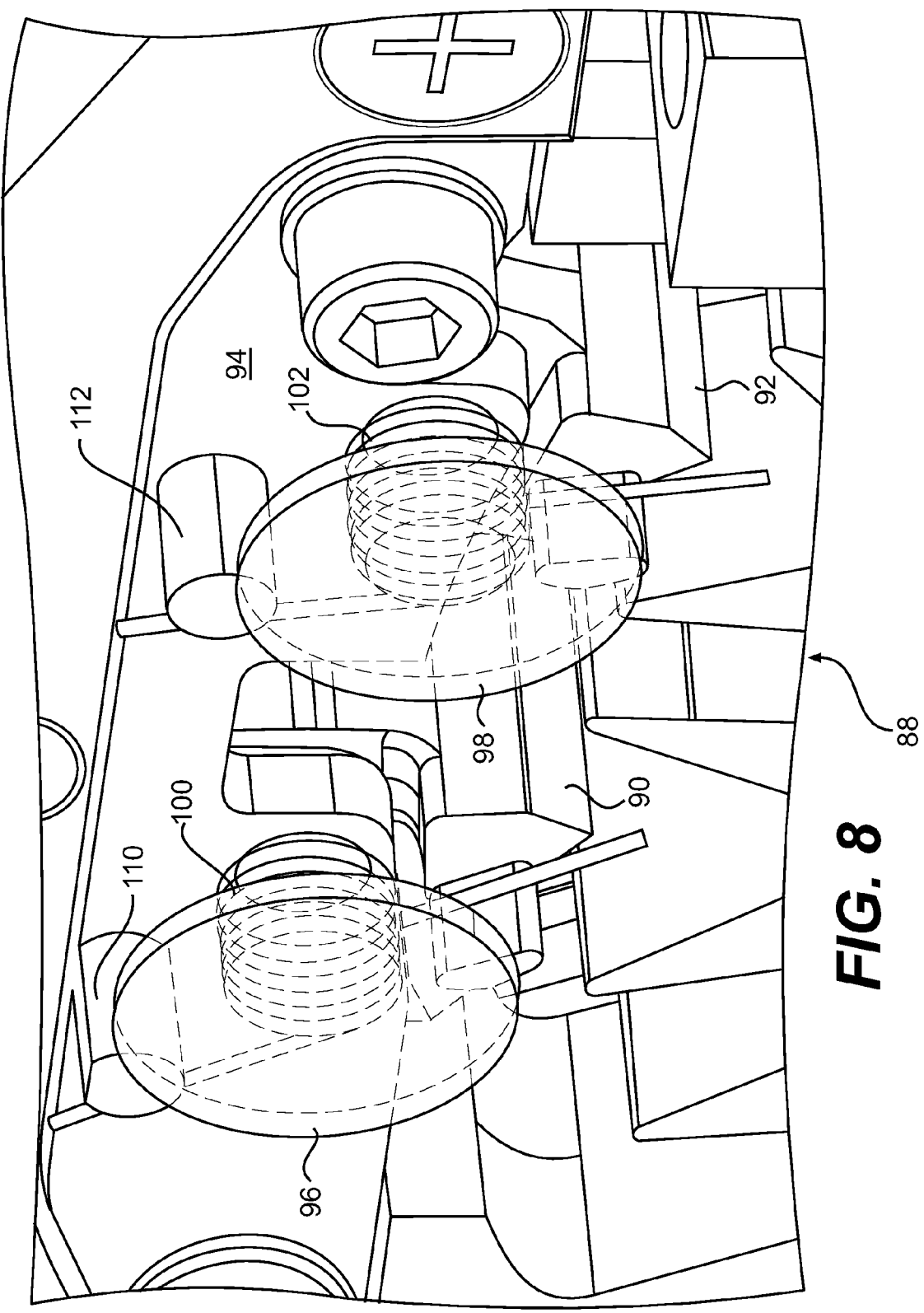
FIG. 8 is a perspective illustration of a ratchet gate device associated with the selector lever of the present invention.

FIG. 8 is a perspective illustration of a portion of the controller 10 that is common to all of the embodiments described for the present invention. FIG. 8 illustrates a gate mechanism 88 disposed near the top of the housing 16. FIG. 1 illustrates the contemplated position of the gate mechanism 88.

The gate mechanism 88 includes a first gate 90 and a second gate 92. The first gate 90 is pivotally connected to a bridge 94 at the position of a first pin 96. As such, the first gate 90 pivots around the first pin 96. Similarly, the second gate 92 is pivotally connected to the bridge 94 at the position of a second pin 98. Accordingly, the second gate 92 pivots around the second pin 98. A first spring 100 extends around the first pin 96 and abuts against a first spring pin 110 at one end the first gate 90 at the other end to maintain the first gate 90 in a closed, blocking position. Similarly, a second spring 102 extends around the second pin 98 and abuts against a second spring pin 112 at one end and the second gate 92 at the other end to maintain the second gate 92 in a closed, blocking position. The first and second gates 90, 92 act as a ratchet to arrest the movement of the lever 12 in one direction, as required by regulations. The gates 90, 92 allow unrestricted movement of the lever 12 in the opposite direction.

Figure 9:
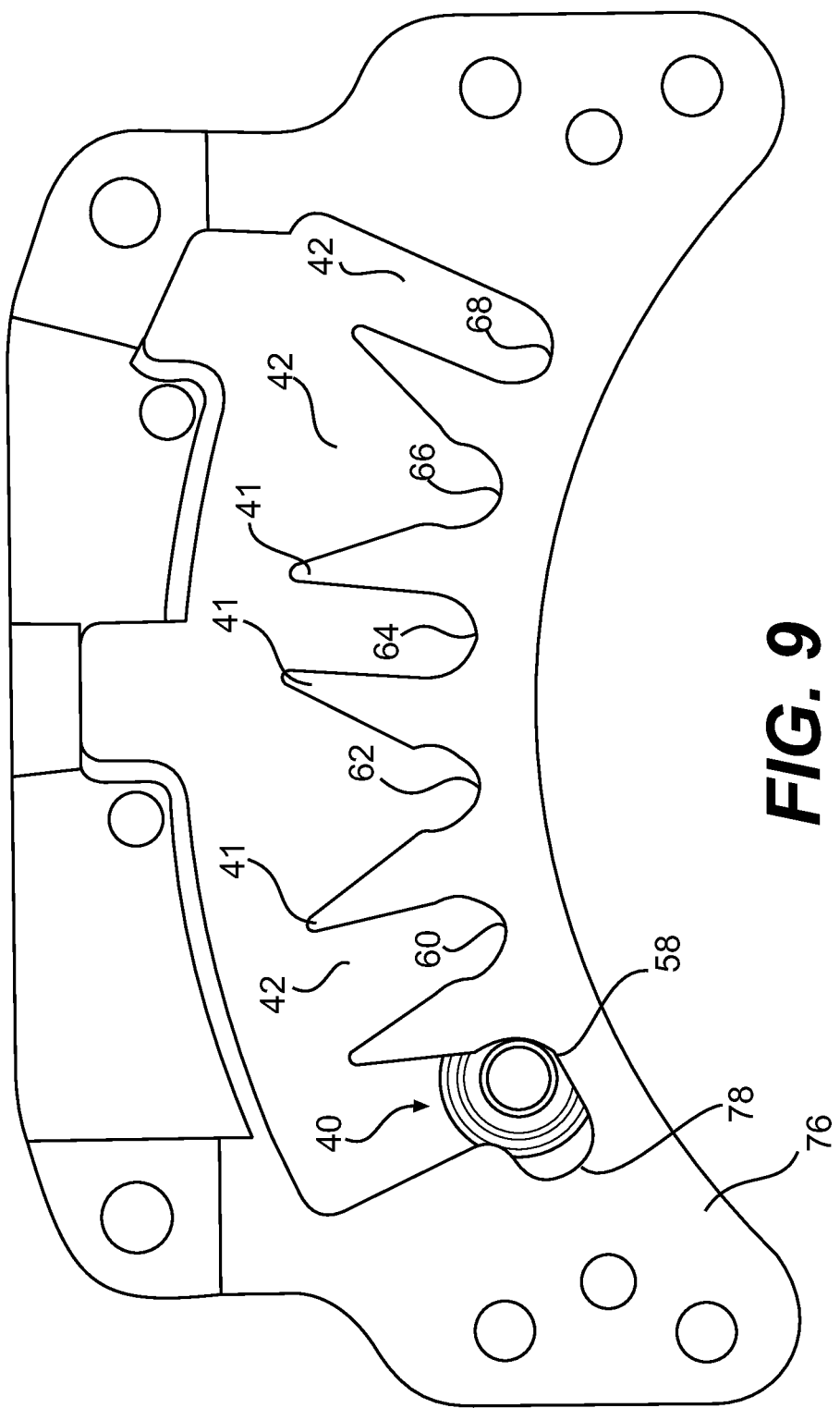
FIG. 9 is a front view of one of the detent plates shown in FIG. 5.

FIG. 9 is a side view of one of the detent plates 76 that are illustrated in FIG. 5. The detent plate 76 is in the same orientation of as the detent plate 76 illustrated in FIG. 5. The protrusion 52 of the pin 40 is shown in the position where the protrusion 52 would be located during non-failure operation. As noted above, if there has been a failure of the protrusion 50, the protrusion 52 engages the failure detection slot 78, permitting detection of the latent defect.

Figure 10:
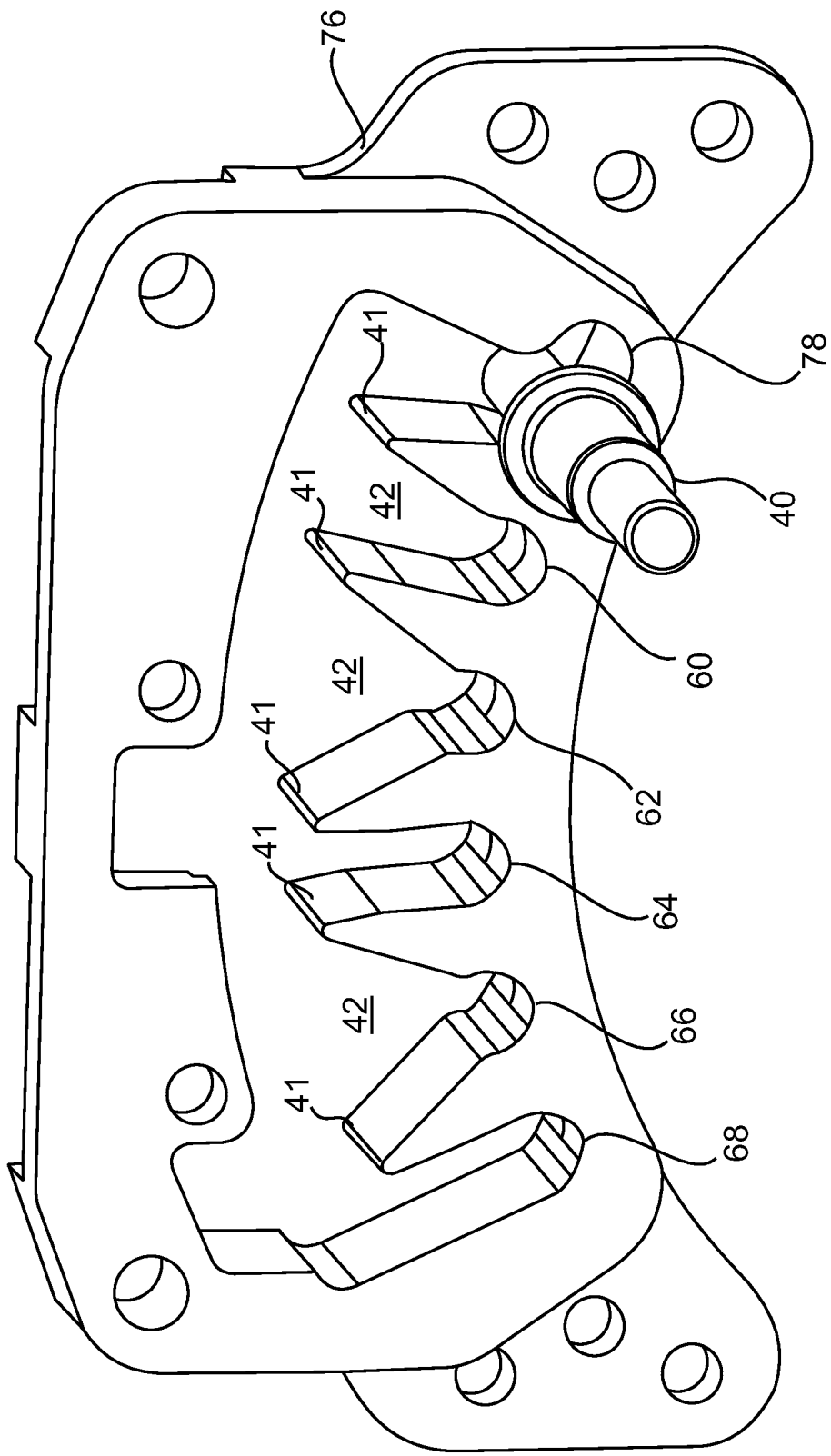
FIG. 10 is a rear view of the detent plate illustrated in FIG. 9.

FIG. 10 is a perspective illustration of the detent plate 76 illustrated in FIG. 9 from the opposite side. The pin 40, together with its protrusions 50, 52, is visible in this view.

In connection with one or more embodiments of the present invention, it is noted that the failure detection slot 74, 78, 82. 86 may be incorporated into any one of the slots 58, 60, 62, 64, 66, 68 without departing from the scope of the present invention. In other words, the present invention should not be understood to be limited to one embodiment where the failure detection slot 74, 78, 82. 86 is included only in the slot 58.

In addition, in one or more of the contemplated embodiments, it is also contemplated that a cover of the housing 16 may be designed to include indicia to illustrate when the lever 12 has exceeded a normal position.

In addition, it is contemplated that electronic sensors may be incorporated within the housing 16 to facilitate detection of a failure or partial failure of one of the protrusions 50, 52. In this contemplated embodiment, a sensor may be provided on the cross-shaft 20. In this embodiment, the sensor would be configured to detect if the lever 12 moves outside of a normal range of operation by detecting, for example, the angular position of the shaft 24. In this embodiment, if one of the protrusions 50, 52 is able to move into one of the failure detection detents 74, 78, 82. 86, the sensor would detect a change in the angular position of the lever 12. The sensor may be connected to an alarm to provide an audible or a visual indication of the potential failure of one of the protrusions 50, 52.

With continued reference to FIG. 1, the sensor 114 may be positioned on (or in association with) the cross-shaft 20. The sensor 114 may transmit a signal to a processor 116 connected thereto. The processor 116, after receiving a signal indicative of a deviation of the lever 12 from a normal position, may then issue an alarm signal to one or more alarm devices, including a speaker 118 that issues an audible alert.

In another contemplated embodiment, sensors (not shown) may be provided in the failure detection slots 74, 78, 82, 86 themselves. In this embodiment, if a protrusion 50, 52 were to contact the sensor, the sensor may be configured to generate a signal that would trigger a suitable alarm.

As noted above, the present invention is described in connection with one or more embodiments thereof. The embodiments are intended to be illustrative of the breadth of the present invention. Focus on any one particular embodiment is not intended to be limiting thereof. The present invention, therefore, is intended to encompass variations and equivalents, as would be appreciated by those skilled in the art.

What is claimed is:

1. A selector lever, comprising:
   a lever having a shaft pivotally disposed on a cross-shaft in the housing, wherein the shaft defines a shaft axis and wherein the lever has a top that is disposed outside of a housing;
   a movable shaft associated with the lever, the movable shaft being movable substantially axially along the shaft axis;
   a pin disposed adjacent to a bottom end of the movable shaft, wherein the pin comprises a first protrusion axially opposed to a second protrusion;
   a first detent plate disposed on a first side of the movable shaft, the first detent plate including at least a first slot therein for receiving the first protrusion;
   a second detent plate disposed on a second side of the moveable shaft, substantially parallel to the first detent plate, the second detent plate including at least a second slot therein for receiving the second protrusion; and
   a first failure detection slot within the at least a first slot of the first detent plate for receiving the first protrusion,
   wherein abutment of the second protrusion against the second detent plate blocks movement of the first protrusion into the first failure detection slot.

2. The selector lever of claim 1, further comprising:
   a biasing element operatively disposed between the shaft and the movable shaft to bias the movable shaft toward the cross-shaft.

3. The selector lever of claim 1, further comprising:
   a second failure detection slot within the at least a second slot of the second detent plate for receiving the second protrusion,
   wherein abutment of the first protrusion against the first detent plate blocks movement of the second protrusion into the second failure detection slot.

4. The selector lever of claim 3, wherein the second failure detection slot is disposed adjacent to a trough of the second slot.

5. The selector lever of claim 3, wherein the second failure detection slot is disposed adjacent to a peak of the second slot.

6. The selector lever of claim 3, wherein the second failure detection slot is disposed between a trough and a peak of the second slot.

7. The selector lever of claim 3, wherein failure of the first protrusion permits the second protrusion to be received within the second failure detection slot.

8. The selector lever of claim 1, further comprising a pin release mechanism connected to the movable shaft, permitting manipulation of the movable shaft so that the lever may be transitioned from a locked to an unlocked condition.

9. The selector lever of claim 8, wherein the top of the lever is cooperative with the pin release mechanism by a hand compression.

10. The selector lever of claim 8, wherein the pin release mechanism comprises:
    a sleeve at least partially surrounding and connected to the movable shaft; and
    a T-shaped top end.

11. The selector lever of claim 1, further comprising a biasing element between the shaft and the movable shaft, wherein the biasing element is a spring.

12. The selector lever of claim 11, wherein the spring is a coil spring.

13. The selector lever of claim 1, wherein the first detent plate includes a plurality of slots.

14. The selector lever of claim 1, wherein the second detent plate includes a plurality of slots.

15. The selector lever of claim 1, wherein the first failure detection slot is disposed adjacent to a trough of the first slot.

16. The selector lever of claim 1, wherein the first failure detection slot is disposed adjacent to a peak of the first slot.

17. The selector lever of claim 1, wherein the first failure detection slot is disposed between a trough and a peak of the first slot.

18. The selector lever of claim 1, wherein the first slot is disposed adjacent to a rear end of the housing.

19. The selector lever of claim 18, wherein the second slot is disposed adjacent to a front end of the housing.

20. The selector lever of claim 1, wherein the first slot is disposed adjacent to a front end of the housing.

21. The selector lever of claim 20, wherein second slot is disposed adjacent to a rear end of the housing.

22. The selector lever of claim 1, wherein the first detent plate and the second detent plate have an inverted symmetry with respect to one another.

23. The selector lever of claim 1, wherein the selector lever provides control for at least one or flaps and slats on an aircraft.

24. The selector lever of claim 1, further comprising:
a sensor to detect a position of the lever that deviates from a predetermined position.

25. The selector lever of claim 24, wherein the sensor is associated with the cross-shaft to detect an angular position of the lever.

26. The selector lever of claim 1, wherein failure of the second protrusion permits the first protrusion to be received within the first failure detection slot.

* * * * *